J. McELWAIN.
VARIABLE SPEED MECHANISM.
APPLICATION FILED NOV. 23, 1915.
1,195,052.
Patented Aug. 15, 1916.
6 SHEETS—SHEET 3.
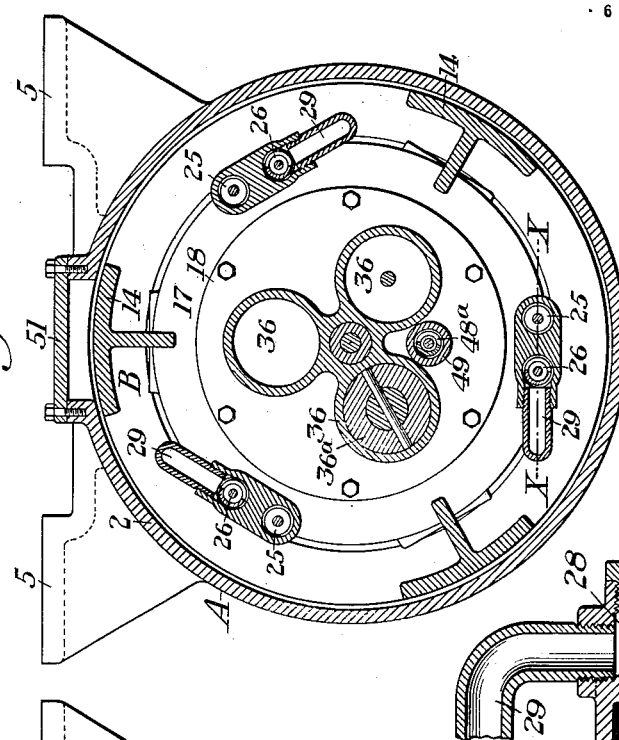
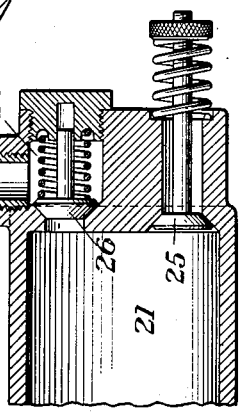
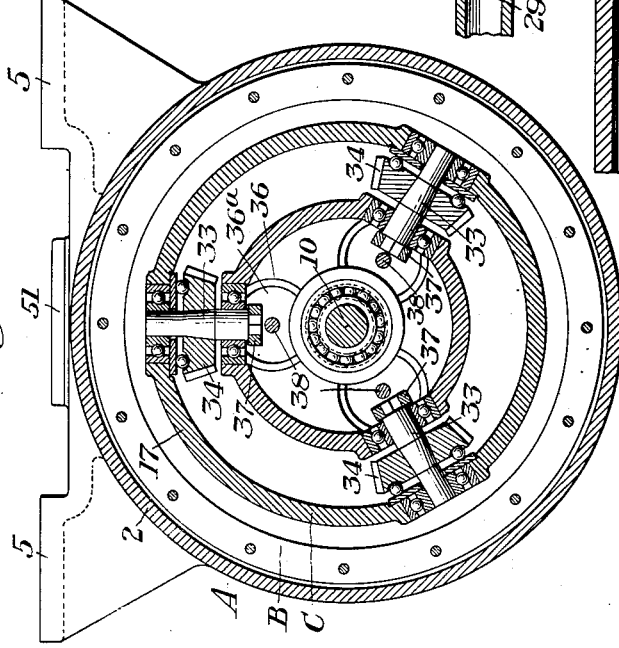
WITNESSES
INVENTOR
James McElwain, J. McELWAIN.
VARIABLE SPEED MECHANISM.
APPLICATION FILED NOV. 23, 1915.
1,195,052.
Patented Aug. 15, 1916.
6 SHEETS—SHEET 4.
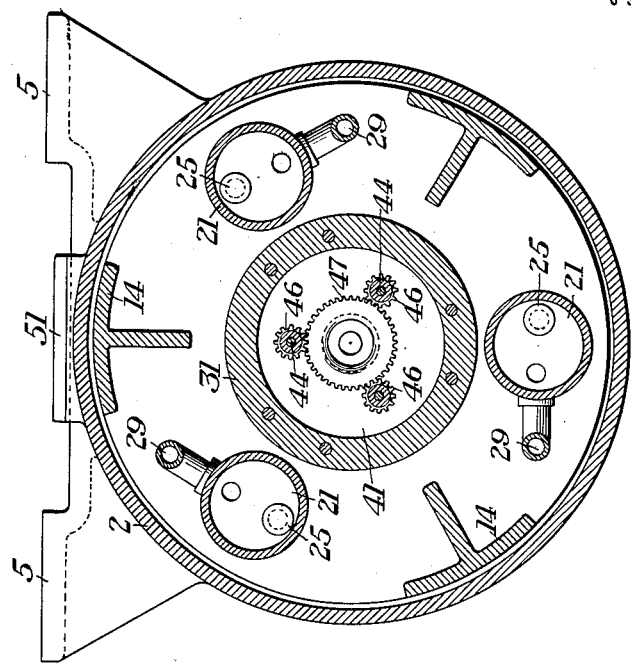
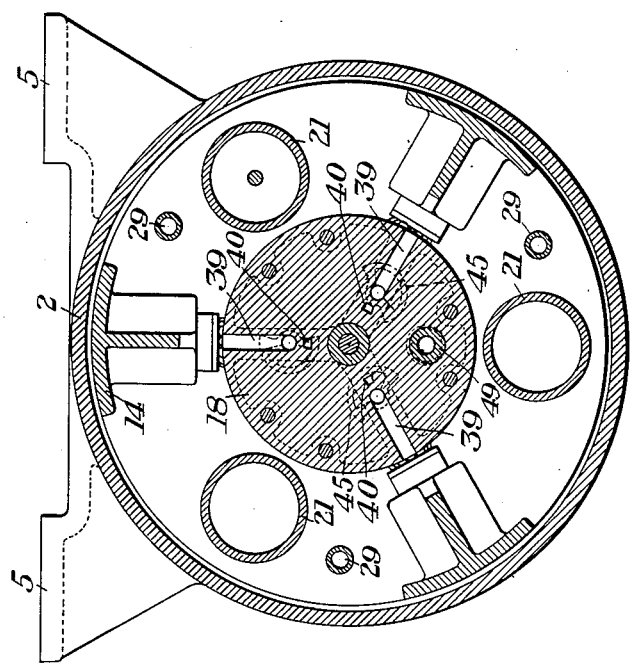

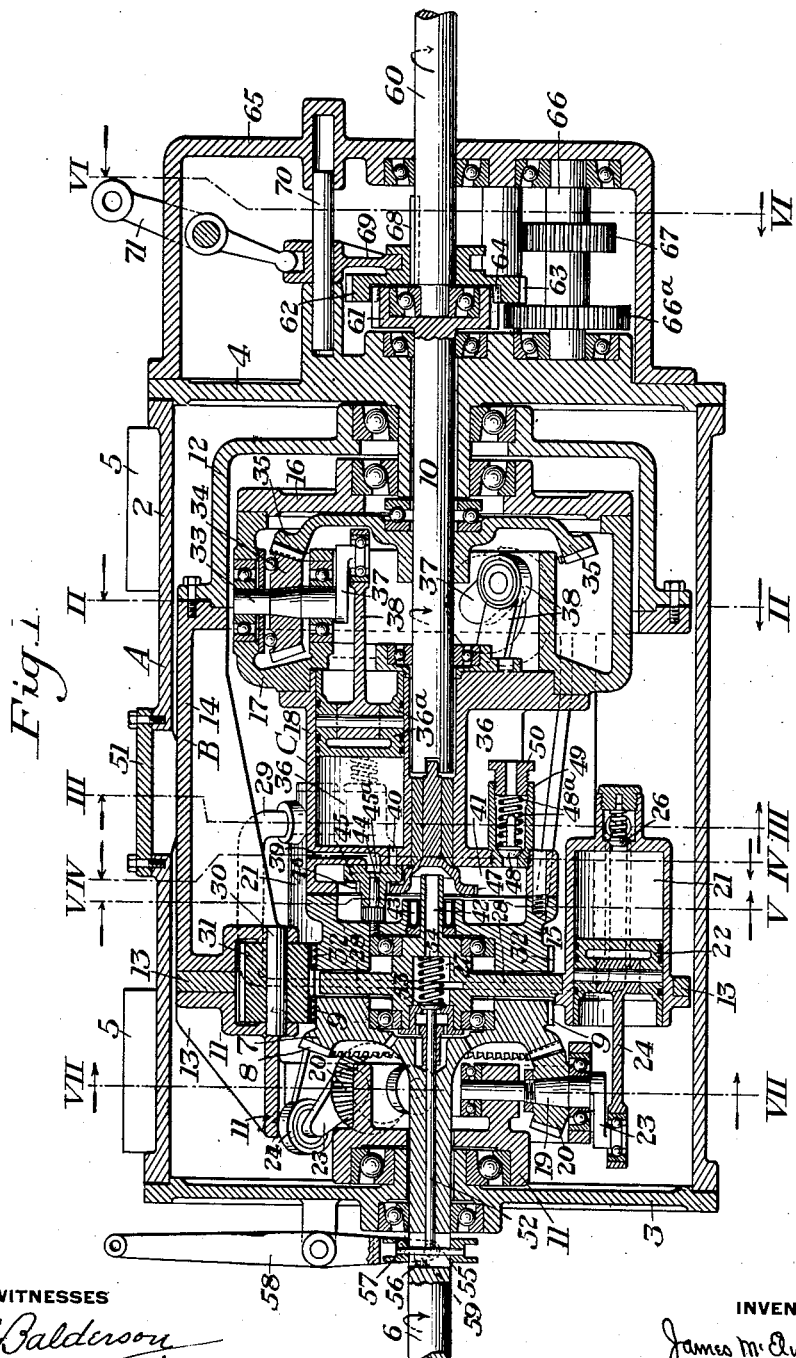

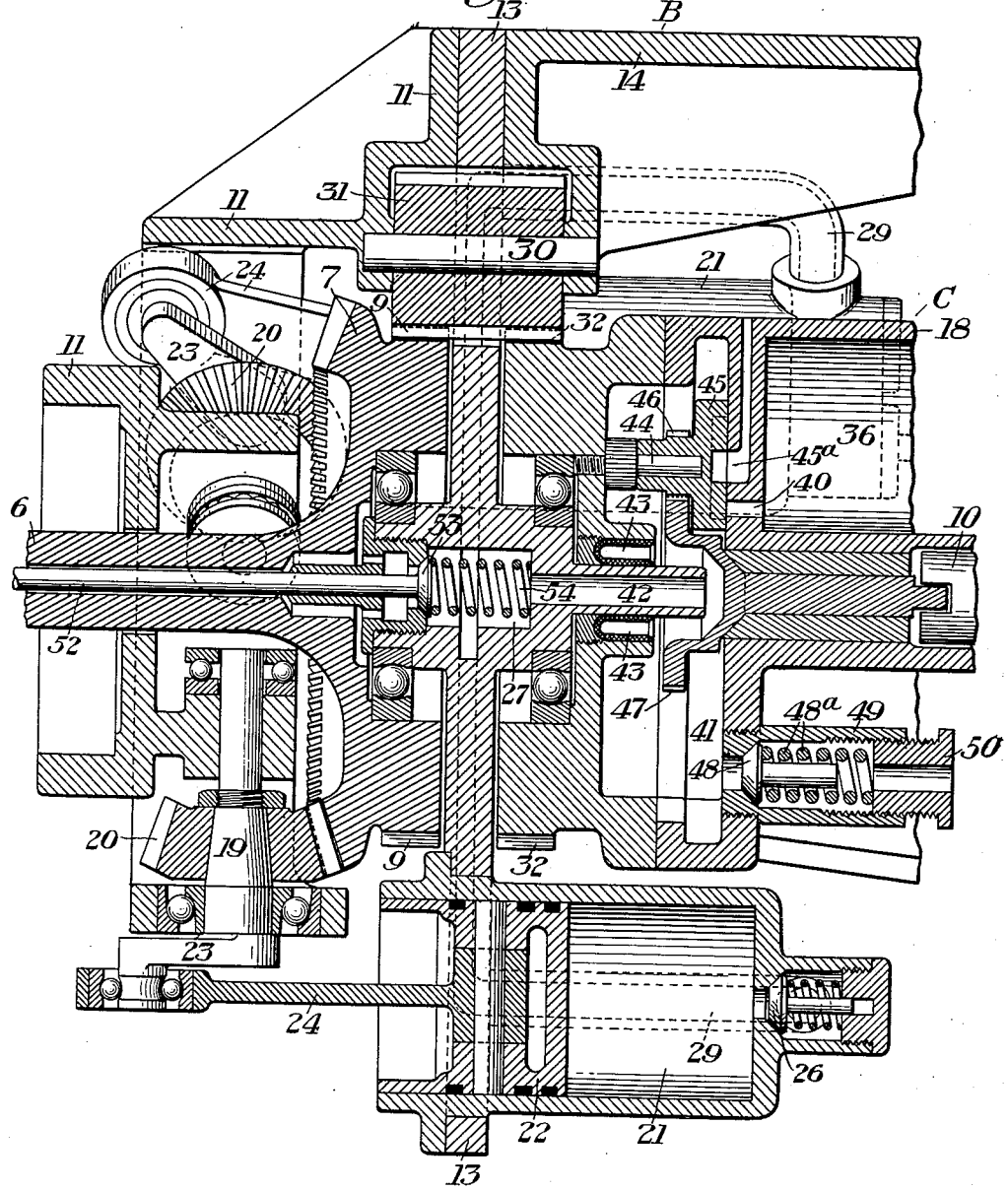

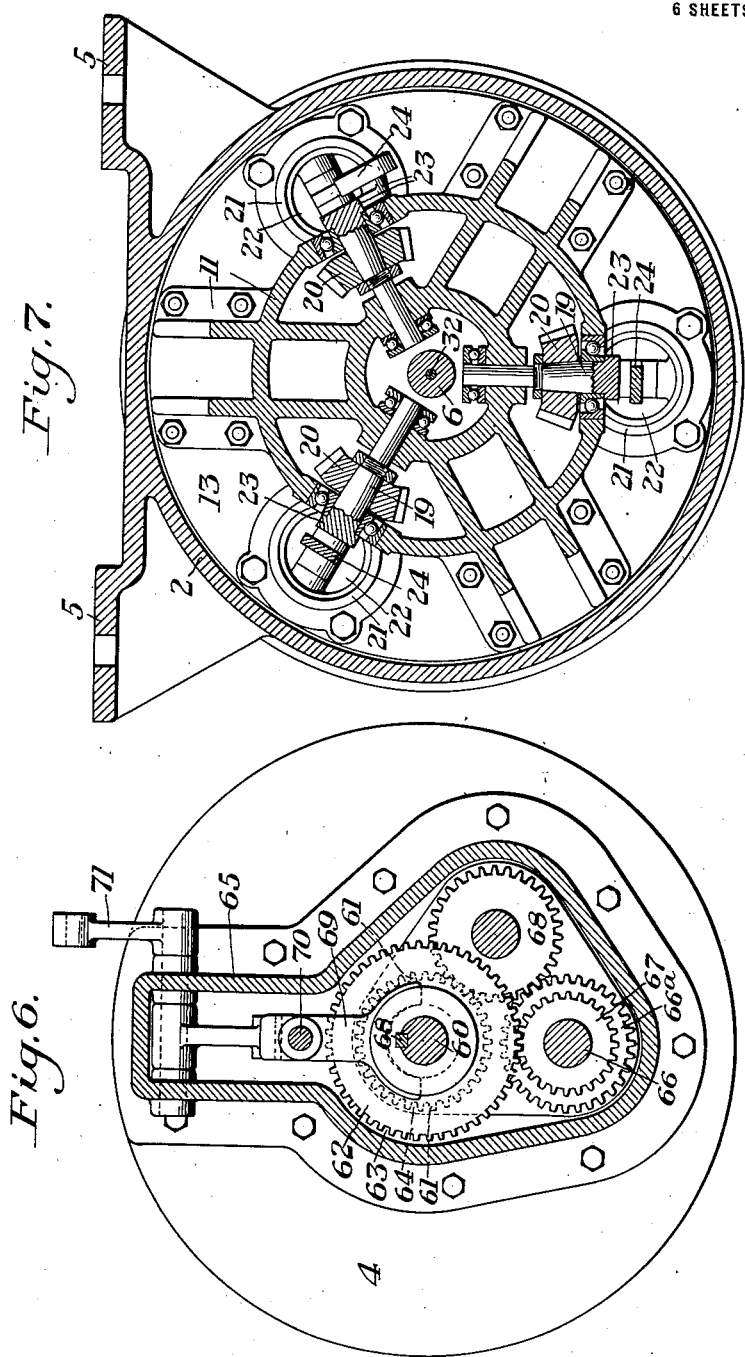

J. McELWAIN.
VARIABLE SPEED MECHANISM.
APPLICATION FILED NOV. 23, 1915.

1,195,052.

Patented Aug. 15, 1916.
6 SHEETS—SHEET 6.

WITNESSES
R. A. Balderson
Jesse B. Heller

INVENTOR
James McElwain
by Bakewell, Byrnes, Parmelee
Atty.

UNITED STATES PATENT OFFICE.

JAMES McELWAIN, OF WHEELING, WEST VIRGINIA, ASSIGNOR TO SAMUEL P. NORTON AND ARTHUR G. HUBBARD, TRUSTEES, OF WHEELING, WEST VIRGINIA.

VARIABLE-SPEED MECHANISM.

1,195,052.   Specification of Letters Patent.   Patented Aug. 15, 1916.

Application filed November 23, 1915. Serial No. 62,961.

*To all whom it may concern:*

Be it known that I, JAMES McELWAIN, a citizen of the United States, residing at Wheeling, in the county of Ohio and State of West Virginia, have invented a new and useful Improvement in Variable-Speed Mechanisms, of which the following is a full, clear, and exact description, reference being had to the accompanying drawings, forming part of this specification, in which—

Figure 8:
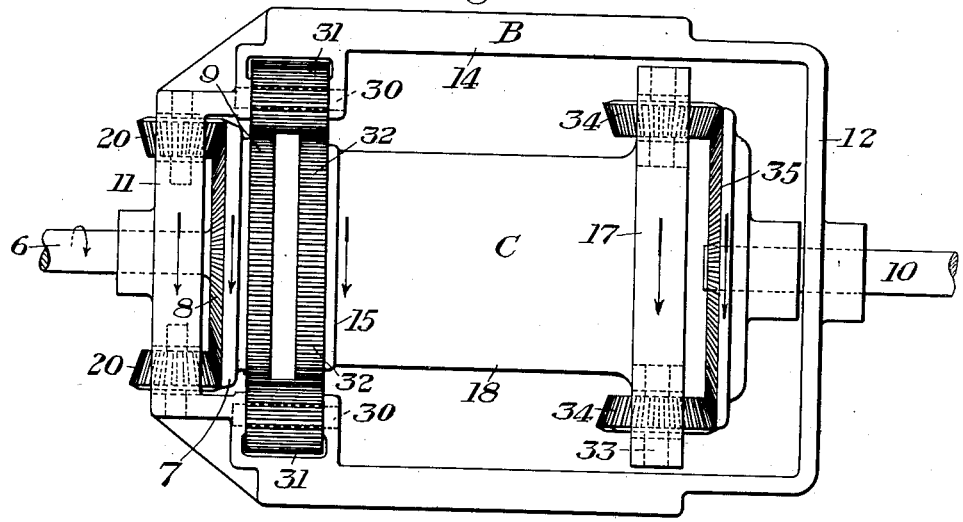
Figure 9:
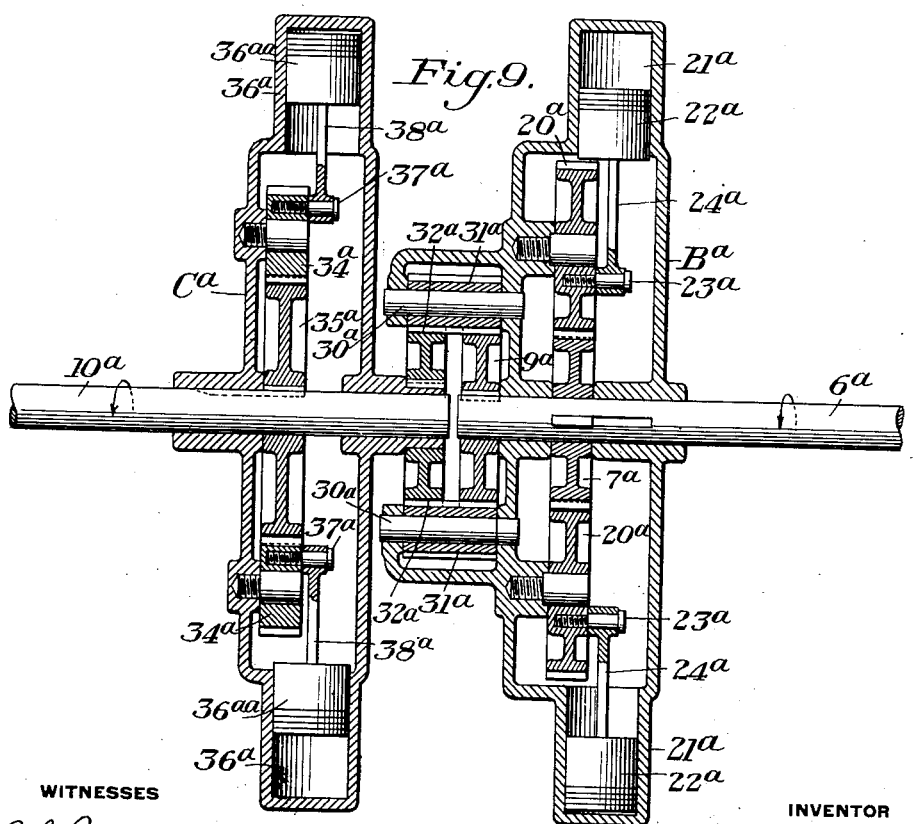

Figure 1 is a longitudinal section through one form of apparatus built in accordance with my invention. Fig. 1ª is a view of a portion of Fig. 1, on a larger scale. Figs. 2, 3 and 4 are transverse sections on the lines II—II, III—III and IV—IV, respectively, of Fig. 1. Fig. 5 is a detailed sectional view on the line V—V of Fig. 1. Figs. 6 and 7 are sectional views on the lines VI—VI and VII—VII, respectively, of Fig. 1. Fig. 8 is a diagram of the device shown in Fig. 1. Fig. 9 is a longitudinal view through a modified form of gearing, and Fig. 10 is a sectional detail view on the line X—X of Fig. 3.

This invention relates to an improvement in variable speed mechanism, and is designed to provide an efficient device of this character in which the power shaft is normally driven at a constant speed, while the speed of the driven shaft will vary in accordance with the load.

The object of my invention is to provide a device of this character in which the driven shaft can be connected to the driving shaft while the same is running at normal speed without shock or jar.

The precise nature of my invention will be best understood by reference to the accompanying drawings which will now be described, it being premised, however, that various changes may be made in the details of construction and the general arrangement of the parts without departing from the spirit and scope of my invention, as defined in the appended claims.

In the drawings, I have shown a device which is more particularly adapted for running automobiles and in which the reference character A designates the casing or housing, which is made up of the cylindrical member 2 and the heads 3 and 4. This housing is provided with lugs 5 for securing it to the chassis of the automobile.

6 designates a driving shaft which is connected to the motor in any desired manner, so that it will be rotated at approximately a constant speed. This shaft 6 is journaled in bearings in the head 3 and one end thereof is provided with a gear 7 having beveled teeth 8 and spur teeth 9, which form a portion of a differential train hereinafter described. Rotatably mounted in bearings in the head 4 is the driven shaft 10 which is in line with the shaft 6 and is arranged to be driven by a sun and planetary gear system, so that the speed of the shaft 10 is controlled by the load.

B designates a housing which is rotatably mounted on central hubs on the heads 3 and 4 which hubs surround the shafts 6 and 10, respectively. This frame is built up of the end members 11 and 12, a disk member 13 and the body member 14 which are secured together by means of bolts, so that they all rotate in unison. The disk member 13 is provided with bearings at its central portion for the gear wheels 7 on the driving shaft and one end of a gear frame C. The other end of this gear frame C is rotatably mounted on the central hub on the head 4, the arrangement being such that the frame C is adapted to rotate within the frame B. This frame C comprises the end members 15 and 16, a spider 17 and a body member 18, which are connected together by means of bolts so as to form a unitary structure. Rotatably mounted in bearings in the end member 11 of the frame B are three crank shafts 19 each of which is provided with a beveled gear 20 which mesh with the teeth 8 on the gear wheel 7. Mounted within the disk member 13 and in line with the crank shafts 19 are pump cylinders 21 which are provided with pistons 22 connected to cranks 23 on the crank shafts 19 through the medium of pitmen 24. Each of these cylinders is provided with an intake check valve 25 and the outlet check valve 26 which communicates with chambers opening into the ends of the cylinders, as shown in Fig. 10.

27 is a pressure chamber in the central portion of the disk member 13 which is in communication with the chambers in the ends of the cylinders by means of ports 28 and tubes 29, the arrangement being such that the pistons will draw air into the cylinders through the check valve 25, when moving in one direction; and will then compress the air and force it out through the check valves 26 to the chamber 27, when moving in the opposite direction.

Rotatably mounted on spindles 30 in the disk members 11 and 14 are spur gears 31 which mesh with the teeth 9 on the gear 7, as well as with the teeth 32 on the end member 15 of the frame C. Rotatably mounted in bearings in the spider 17 are three crank shafts 33, each of which is provided with a bevel gear 34, which mesh with the bevel gear 35 secured to the shaft 10.

36 are cylinders which are formed in the body member 18 of the frame C, there being three of these cylinders within this frame, and each is provided with a piston 36ª which is connected with a crank 37 by means of a pitman 38 on its respective crank shaft 33. The end heads of each of these cylinders are provided with exhaust ports 39 and inlet ports 40.

41 is a pressure chamber in the member C, formed between the body member and the end member 15, which is constantly in communication with the pressure chamber 27 in the disk member 13, by means of a port 42. This port 42 extends through a central tube formed integral with the disk member 13 or secured thereto in any manner. Surrounding this tube member and within an annular flange on the end member 15 is a packing member 43 which is adapted to maintain a tight joint between the frames B and C. Within the chamber 41 are pins 44 and mounted therein are valves 45 for controlling the admission and exhaust of air to and from the cylinders 36. Each of these valves is provided with a port 45ª to open communication between the port 40 and the exhaust port 39 and they are also provided with a cut-away portion to admit pressure to their respective cylinders through the port 40 from the chamber 41.

46 are pinions formed on the stems of the valves which are in mesh with the gear wheel 47, which is mounted on the end of a stem rotatably mounted within the central portion of the frame C, and is connected to one end of the driven shaft 10 by means of a tongue and groove connection.

The valves controlling admission of pressure to the motor cylinders 36, and the exhaust therefrom are set so that the movement of the motors will actuate the gears 34, to cause the frame to rotate clockwise.

The pressure chamber 41 is provided with a relief valve 48 which is held to its seat by a compression spring 48ª in a casing 49, the tension of the spring being adjusted by the hollow nut 50 adjustably mounted in the end of the casing 49; and 51 is a hand-hole cover for a hand-hole in the body portion 2 of the frame A, through which access can be had to adjust the tension of the spring 48ª.

52 is a stem slidably mounted within the driving shaft 6, which is provided at one end with a control valve 53 which is normally held to its seat by a spring 54, and which valve is adapted to relieve the pressure in the chambers 27 and 41 for the purpose hereinafter described. The end of the stem 52 is in line of movement of the pin 55 extending through the shaft 6, in a slot 56 extending through the shaft 6, and is connected to a grooved disk 57 slidably mounted on the shaft 6.

58 is a lever pivoted to projections extending from the head 3 and is provided with a yoke 59 at one end having pins which engage the groove in the disk 57 to shift the disk and thereby open the valve 53.

As before described, the shaft 6 is constantly driven in a clockwise direction at approximately a constant speed by the engine on the car, and the shaft 10 will be driven through the medium of the differential gearing in a similar direction, the speed of the shaft being controlled by the load thereon. As the only clutch driving connections between the two frames B and C are the pumps and motors, it will readily be understood that, when the valve 52 is open, there will not be any driving connection between the gear wheel 7 on the shaft 6 and the gear wheel 35 on the shaft 10, so that when this valve is open the engine shaft will not be operatively connected to the driven shaft. The ratio of the gears throughout the differential gearing is three to one, so that each revolution of the frame B with relation to the shaft 6 will reciprocate each pump piston 22 three times, while the motor piston 36 will be reciprocated three times for each revolution of the frame C with relation to the shaft 10. The valve 45 will be actuated in timed relation with the movement of the frame C and the shaft 10, and as the pinions 46 are one-third the size of the gear wheel 47, each valve will be rotated three times for each revolution of the frame C with relation to the shaft 10.

I will now generally describe the operation of the device when the car is on level ground, or the load on the shaft 10 is such that the driving power of shaft 6 is sufficient to drive shaft 10 at the same speed as shaft 6.

Assuming that the engine is running so as to rotate the shaft 6 in a clockwise direction when coupled thereto by any suitable device and it is desired to rotate shaft 10. The operator first opens valve 53 and connects the shaft 6 to the engine shaft and thereby cause the shaft 6 to rotate clockwise and as there is no connection between frames B and C, due to the valve 53 being open, the frame B will be rotated counter-clockwise by the gears 31, without affecting the frame C or the shaft 10, the gears 31 running idly in the teeth 9 of the gear 7. The valve 53 is then closed, which causes the pumps to build up pressure in the chambers 27 and 41. This causes the motors to become active and rotate the frame C together with the shaft 10 clockwise. This clockwise movement of the frame C checks the counter-clockwise movement of the frame B; and as the speed of the frame C is increased by the increased pressure, the counter-clockwise movement of the frame B is gradually decreased, until it becomes stationary. As the speed of the frame C further increases, the frame B will be rotated clockwise at a gradually increasing speed until the speed thereof and the speed of the frame C are equal to the speed of the shaft 6, at which time all the parts will rotate as a unit, the frame C being rotated by the action of the gears 31—on the gear teeth 9 and 32. At this time the pumps and motors will be inactive, with the exception that they form the clutching means between the driving and driven members. The clockwise movement of the shaft 6 will rotate the frame B in a counter-clockwise direction through the medium of the gears 31 meshing with teeth 9 and 32. As the frame B is rotated the pinions 20 will be rotated through the medium of the teeth 8 which will actuate the pump pistons 22 and thereby build up a pressure within the chambers 27 and 41. This pressure will, in turn, actuate the motor pistons 36$^a$ which will rotate the pinions 34 in a direction to move the frame C clockwise.

If the car is run on level ground and the power required to drive the shaft 10 at a speed equal to the speed of the shaft 6 is not greater than the power of the engine at this speed, the speed of the shaft 10 will gradually be increased through the medium of the pumps and motors until the shaft 10 rotates at the speed of the engine shaft. The frames B and C, together with all of the mechanism connected thereto will now rotate in unison with the two shafts. If the load increases to an extent that the power required to rotate the shaft 10 at the speed of the engine shaft is greater than the power of the engine, the speed of the shaft 10 will gradually decrease relative to the shaft 6 as the load increases.

Assuming that under normal conditions the driving shaft is run at 1000 revolutions per minute and is capable of lifting a load of 1000 pounds at this speed, and that at this time the pressure between the pump cylinders and the motor cylinders is 50 pounds: under these conditions the entire mechanism will revolve as a unit about the axes of the driving and driven shafts. If the load should be increased to 2000 pounds, it will be assumed that the pressure between the pumps and the engine will be increased to 100 pounds, and the speed of the driven shaft will be reduced to 500 revolutions per minute.

The action of the motors upon the gears 34 is in a direction to increase the speed of the shaft 10 relatively to the speed of the frame C. When this occurs the gears have a differential action so that the frames B and C may be rotated at relatively different speeds, although under the original assumptions the shaft 6 and the gear 7 are running at a constant speed. It, therefore, follows that the power which is generated by the pumps is transmitted to the motors and there utilized to assist in taking care of the increased load on the shaft 10; and that the speed of the latter will thus automatically adjust itself to variations in load. It will be further understood from the foregoing description that if the load conditions are such that the pumps and motors are mutually locked against action, the pressure in the motors being equal to that in the pumps; and that in this condition the pumps and motors serve merely as clutches for effecting the driving connections between the driving and driven sides of the system. Just as soon, however, as the speed of the shaft 10 changes relatively to that of the shaft 6, the pumps and motors are set into operation; and in the case of increased load the motors are made effective to assist in taking care of said load.

If this driving mechanism is used in connection with automobiles it is essential that the shaft connected to the driving mechanism of the automobile can be driven either to the right or to the left. I have, therefore, connected a reversing mechanism with the shaft 10 which in turn drives the automobile shaft 60. Fixedly connected to the end of the shaft 10 is a gear wheel 61, and slidably mounted on the shaft 60 is a gear wheel 62 having external teeth 63 and internal teeth 64. The internal teeth 64 are arranged to engage the teeth of the wheel 61 when the wheel is in the position shown in Fig. 1 of the drawings, so as to drive the shaft 60 in a clockwise direction when the wheels 62 and 61 are connected to each other.

Rotatably mounted in bearings in the head 4 and a frame 65 is a short shaft 66 which is provided with a gear wheel 66$^a$ and a pinion 67. The gear wheel 66$^a$ is normally in engagement with the gear wheel 68 which meshes with the gear wheel 61 and when the gear wheel 62 is moved longitudinally along the shaft 60 so that the teeth 63 mesh with the gear wheel 67, the shaft 60 will be rotated counter-clockwise. The gear 61 is slidably mounted on a spline 68$^a$ seated in the shaft 60 and is also provided with a groove which is engaged by a yoke 69. This yoke 69 is connected to a guide rod 70 slidably mounted in guides in the frame 65 and the head 4, and is arranged to be actuated by a lever 71 to connect the gear 62 with the gear 61 or the gear 67, or to shift said gear to a central position so that the differential driving mechanism will not be connected with the shaft 60.

In Fig. 9 I have illustrated a modified form of differential gear in which I have applied the same reference characters with the letters "a" affixed, and in which I have shown spur gears instead of the beveled gears shown in the other figures. In this construction I have not illustrated the connections between the pump cylinders 21ª and the motor cylinder 36ª.

The advantages of my invention result from the provision of a variable speed transmission gearing connecting a driving shaft and a driven shaft in connection with the pump and motor system which are arranged to vary the speed of the driven shaft with relation to the speed of the driving shaft in accordance with the load on the driven shaft.

I claim:

1. Variable speed transmission gearing, comprising a driving shaft, a driven shaft, differential gearing connecting the two shafts, a pump mounted on the driving shaft and adapted to rotate about the axis thereof, a motor mounted on the driven shaft and adapted to rotate about the axis thereof, and pressure transmitting connections between the pump and the motor; substantially as described.

2. Variable speed transmission gearing, comprising a driving shaft, a driven shaft, differential gearing connecting the two shafts, a pump mounted on the driving shaft and adapted to rotate about the axis thereof, a motor mounted on the driven shaft and adapted to rotate about the axis thereof, and pressure transmitting connections between the pump and the motor, the pump and motor forming a variable clutch connection between the differential gear elements and the driving and driven shafts respectively; substantially as described.

3. Variable speed transmission gearing, comprising a driving shaft, a driven shaft, differential gearing connecting the two shafts, a pump connected to the driving shaft, a motor connected to the driven shaft, and pressure transmitting connections between the pump and the motor, together with valve mechanism for the motor controlled by the rotation of the driven shaft; substantially as described.

4. Variable speed transmission gearing, comprising a driving shaft, a driven shaft, differential gearing connecting the two shafts, a pump connected to the driving shaft, a motor connected to the driven shaft, pressure transmitting connections between the pump and motor, and a relief valve in said connections; substantially as described.

5. Variable speed transmission gearing, comprising a driving shaft, a driven shaft, differential gearing connecting the two shafts, a pump connected to the driving shaft, a motor connected to the driven shaft, pressure transmitting connections between the pump and motor, and a control valve in said connections for permitting pressure to escape to the atmosphere; substantially as described.

6. Variable speed transmission gearing, comprising a driving shaft, a driving gear, two sets of planetary gears engaging the driving gear, a pump system operated by one set of the planetary gears, a driven gear actuated by the other set of planetary gears, a driven shaft, a sun and planetary gear connection between the last named gear wheel and the driven shaft, a motor system actuated by the last named planetary gears, and pressure transmitting connections between the pump system and the motor system; substantially as described.

7. Variable speed transmission gearing, comprising a driving shaft, a driven shaft, a gear connected to the driving shaft, a frame rotatably mounted relative to the driving and driven shafts, two sets of planetary gears engaging the gear connected to the driving shaft, a pump system carried by said frame and connected to one set of the planetary gears, a second frame rotatably mounted about the axes of the shafts, a driven gear connected to said second frame, a sun and planetary gear connection between the second frame and the driven shaft, a motor system connected to the second frame, actuating connections between said motors and the last named planetary gears, and pressure transmitting connections between the pump system and the motor system; substantially as described.

8. Variable speed transmission gearing, comprising a driving shaft, a driven shaft, a gear connected to the driving shaft, a frame rotatably mounted relative to the driving and driven shafts, two sets of planetary gears engaging the gear connected to the driving shaft, a pump system carried by said frame and connected to one set of the planetary gears, a second frame rotatably mounted about the axes of the shafts, a driven gear connected to said second frame, a sun and planetary gear connection between the second frame and the driven shaft, a motor system connected to the second frame, actuating connections between said motors and the last named planetary gears, and pressure transmitting connections between the pump system and the motor system, together with a controlling valve in said connections for permitting the pressure from the pump system to pass to the atmosphere; substantially as described.

9. Variable speed transmission gearing, comprising a driving shaft, a driven shaft, a gear connected to the driving shaft, a frame rotatably mounted relative to the driving and driven shafts, two sets of planetary gears engaging the gear connected to the driving shaft, a pump system carried by said frame and connected to one set of the planetary gears, a second frame rotatably mounted about the axes of the shafts, a driven gear connected to said second frame, a sun and planetary gear connection between the second frame and the driven shaft, a motor system connected to the second frame, actuating connections between said motors and the last named planetary gears, and pressure transmitting connections between the pump system and the motor system, a valve system for the motors carried by the second frame, together with actuating connections between said valve system and the driven shaft for actuating the valves in timed relation; substantially as described.

In testimony whereof, I have hereunto set my hand.

JAMES McELWAIN.

Witnesses:
  W. SCHAFER,
  A. G. HUBBARD.